(12) United States Patent
Pigos

(10) Patent No.: US 9,987,608 B2
(45) Date of Patent: Jun. 5, 2018

(54) METHODS AND APPARATUSES FOR PRODUCING DISPERSED NANOSTRUCTURES

(71) Applicant: NanoSynthesis Plus, Ltd., Columbus, OH (US)

(72) Inventor: Elena Pigos, Lewis Center, OH (US)

(73) Assignee: NANOSYNTHESIS PLUS, LTD., Columbus, OH (US)

( * ) Notice: Subject to any disclaimer, the term of this patent is extended or adjusted under 35 U.S.C. 154(b) by 87 days.

(21) Appl. No.: 14/858,786

(22) Filed: Sep. 18, 2015

(65) Prior Publication Data

US 2016/0082404 A1 Mar. 24, 2016

Related U.S. Application Data

(60) Provisional application No. 62/053,044, filed on Sep. 19, 2014, provisional application No. 62/098,267, filed on Dec. 30, 2014.

(51) Int. Cl.

| B01J 8/24 | (2006.01) |
|---|---|
| B01J 13/00 | (2006.01) |
| H01B 1/06 | (2006.01) |
| H01B 1/04 | (2006.01) |
| C09K 5/08 | (2006.01) |
| B01J 8/12 | (2006.01) |
| B01J 19/24 | (2006.01) |

(52) U.S. Cl.
CPC ........... *B01J 13/0095* (2013.01); *B01J 8/125* (2013.01); *B01J 8/24* (2013.01); *B01J 19/2415* (2013.01); *C09K 5/08* (2013.01); *H01B 1/04* (2013.01); *H01B 1/06* (2013.01)

(58) Field of Classification Search
CPC .... B01J 13/0095; B01J 19/2415; B01J 8/125; B01J 8/24; H01B 1/06; H01B 1/04; C09K 5/08
USPC ................. 427/446; 422/129, 211
See application file for complete search history.

(56) References Cited

U.S. PATENT DOCUMENTS

| 6,908,572 B1 | 6/2005 | Derbyshire et al. | |
|---|---|---|---|
| 2001/0004473 A1* | 6/2001 | Strutt | B01J 13/02 |
| | | | 427/446 |
| 2004/0151654 A1 | 8/2004 | Wei et al. | |
| 2007/0148962 A1 | 6/2007 | Kauppinen et al. | |
| 2008/0193763 A1 | 8/2008 | Hunt et al. | |
| 2009/0022652 A1 | 1/2009 | Sato et al. | |
| 2009/0176100 A1 | 7/2009 | Higashi et al. | |
| 2009/0220409 A1 | 9/2009 | Curliss et al. | |
| 2009/0226704 A1 | 9/2009 | Hunt et al. | |
| 2010/0254886 A1 | 10/2010 | McElrath et al. | |
| 2010/0260931 A1 | 10/2010 | Malecki et al. | |
| 2011/0123409 A1* | 5/2011 | Phamhuu | B01J 19/0093 |
| | | | 422/211 |
| 2011/0150746 A1 | 6/2011 | Khodadadi et al. | |
| 2012/0107221 A1 | 5/2012 | Bai | |
| 2013/0059074 A1 | 3/2013 | Xu et al. | |
| 2014/0147592 A1 | 5/2014 | Hart et al. | |

FOREIGN PATENT DOCUMENTS

| CN | 1403371 A | 3/2003 |
|---|---|---|
| CN | 1948145 A | 4/2007 |
| JP | 2006-143491 A | 6/2006 |
| JP | 2006-143491 A2 | 6/2006 |
| WO | WO 2004/035881 A2 | 4/2004 |
| WO | WO 2004/035881 A3 | 4/2004 |
| WO | WO 2007/069267 A2 | 6/2007 |
| WO | WO 2007/069267 A3 | 6/2007 |
| WO | WO 2009/110885 A1 | 9/2009 |
| WO | WO 2013/083931 A1 | 6/2013 |

OTHER PUBLICATIONS

International search report and written opinion dated Dec. 18, 2015 for PCT/US2015/050985.
Ahir, et al. Polymers with aligned carbon nanotubes: Active composite materials. Polymer 49 (2008) p. 3841-3854.
Al-Rub, et al. On the aspect ratio effect of multi-walled carbon nanotube reinforcements on the mechanical properties of cementitious nanocomposites. Construction of Building Materials 35 (2012) p. 647-655.
Bakshi, et al. Carbon nanotube reinforced metal matrix composites—A Review. International Material Reviews, 2010, vol. 55, No. 1, p. 41-64.
Chandran, et al. Effect of carbon nanotube dispersion on mechanical properties of aluminum-silicon alloy matrix composites. ASM International, JMEPEG 2014, 23: 1028-1037.
Chatterjee, et al. Syntheses of boron nitride nanotubes from borazine and decaborane molecular precursors by catalytic chemical vapor deposition with a floating nicket catalyst. American Chemical Society, 2012, p. 2872-2879.
Cho, et al. Ceramic matrix composites containing carbon nanotubes. Department of Chemistry, Imperial College London, p. 1-50.
Curtin, et al. CNT-reinforced ceramics and metals. Materials Today, Nov. 2004, p. 44-49.
Ferro, et al. Carbon nanotubes cement composites. Gingno 2011 p. 49-59.
Gao, et al. Noncovalent functionalization of boron nitride nanotubes in aqueous media opens application roads in nanobiomedicine. Nanobiomedicine, 2014, p. 1-14.

(Continued)

*Primary Examiner* — Douglas J McGinty
(74) *Attorney, Agent, or Firm* — Wilson Sonsini Goodrich & Rosati

(57) ABSTRACT

Methods and apparatuses are provided for the production of homogeneous dispersions of nanostructures within a matrix, which may be used as precursors of carbon-reinforced or boron nitride-reinforced composite materials. An apparatus for producing a nanostructure dispersion comprises a reactor and a mixing chamber, wherein the reactor is configured to produce an aerosol of nanostructures and is in fluidic communication with the mixing chamber. A matrix material is provided in the mixing chamber, and the aerosol of nanostructures can disperse into the matrix material to form a nanostructure dispersion. The apparatus may further comprise a matrix tank comprising a matrix material, wherein the matrix material is transferred to the mixing chamber. An aerosol of matrix particles may be produced from the matrix material and provided in the mixing chamber, so as to produce a fine dispersion of nanostructures in the matrix. The apparatus may be configured to continuously produce a nanostructure dispersion.

79 Claims, 3 Drawing Sheets

(56) References Cited

OTHER PUBLICATIONS

Figure 2:
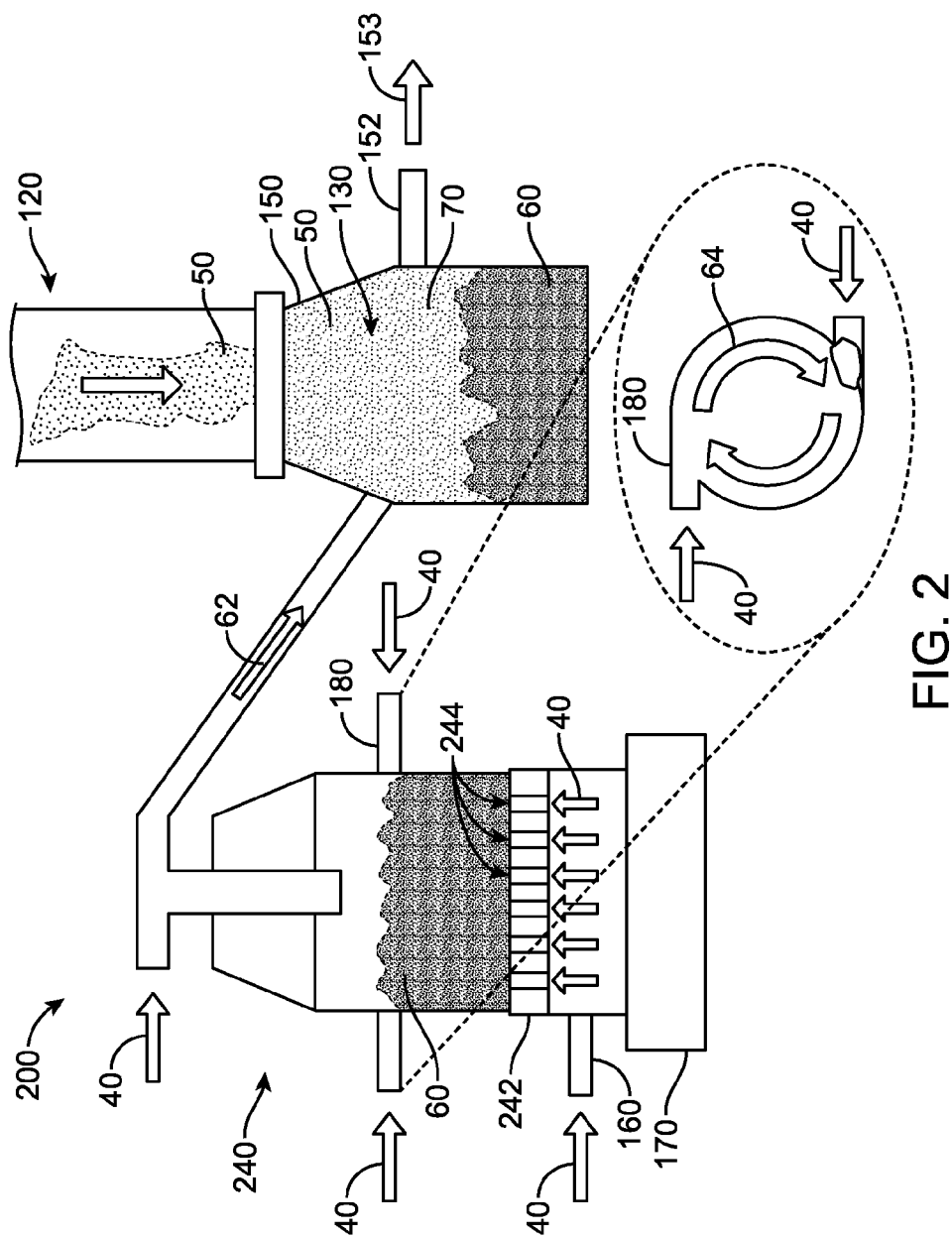

Jin, et al. A review of the preparation and properties of carbon nanotubes-reinforced polymer composites. Carbon Letters vol. 12, No. 2, 2011, p. 57-69.

Jogi, et al. Dispersion and performance properties of carbon nanotubes (CNTs) based polymer composites: A Review. Journal of Encapsulation and Adsorption Sciences, 2012, 2, p. 69-78.

Kamalakaran, et al. In-situ formation of carbon nanotubes in an alumina-nanotube composite by spray pyrolysis. Carbon 41 (2003) p. 2737-2741.

Khare, et al. Carbon nanotube based composites—A Review. Journal of Minerals & Materials Characterization & Engineering, vol. 4, No. 1, p. 31-46, 2005.

Kim, et al. Double-walled boron nitride nanotubes grown by floating catalyst chemical vapor deposition. Nano Letters, vol. 8, No. 10, 2008, p. 3298-3302.

Kumar, et al. Composites reinforced with carbon nanotubes—A Review. J. Environ. Nanotechnol. vol. 2, No. 3, p. 67-80.

Lahiri, et al. Boron nitride nanotubes reinforced aluminum composites prepared by spark palsma sintering: Microstructure, mechanical properties and deformation behavior. Material Science & Engineering A 574 (2013) p. 149-156.

Lee, et al. Effective growth of boron nitride nanotubes by thermal chemical vapor deposition. Nanotechnology 19 (2008) 455605 (5pp).

Liu, et al. Developing high-performanc aluminum matrix composites with directionally aligned carbon nanotubes by combining friction stir processing and subsequent rolling. Carbon 62 ( 2013) p. 35-42.

Liu, et al. Fabrication of carbon nanotubes reinforced AZ91D composites by ultrasonic processing. Trans. Nonferrous Met. Soc. China 20 (2010) p. 1222-1227.

Lourie, et al. CVD growth of boron nitride nanotubes. Chem. Mater. 2000, 12, p. 1808-1810.

Muhsan, et al. Uniform dispersion of multiwalled carbon nanotubes in copper matrix nanocomposites using metal injection molding technique. International Journal of Manufacturing Engineering, vol. 2013, p. 1-9.

Pakdel, et al. A comprehensive analysis of the CVD growth of boron nitride nanotubes. Nanotechnology 23 (2012) 215601 (10pp).

Peigney, et al. Carbon nanotubes in novel ceramic matrix nanocomposites. Ceramics International 26 (2000) p. 677-683.

Silvestre, N. State-of-the-art review on carbon nanotube reinforced metal matrix composites. International Journal of Composite Materials 2013, 3(6A): p. 28-44.

Stein, et al. High-perfon lance metal matrix composites reinforced by carbon nanotubes. 18th International Conference on Composite Materials, p. 1-5.

Tang, et al. Controlled synthesis of quasi-one-dimensional boron nitride nanostructures. J. Mater. Res., vol. 22, No. 10, Oct. 2007, p. 2809-2816.

Wang, et al. Multiwalled boron nitride nanotubes: Growth, properties, and applications. Department of Physics, Michigan Technological University, 118 Fisher Hall, p. 23-44.

Wang, et al. Synthesis of boron nitride nanotubes by self-propagation high-temperature synthesis and annealing method. Journal of Nanomaterials, vol. 2010, p. 1-6.

Yang, et al. Fabrication of carbon nanotube reinforced Al composites with well-balanced strength and ductility. Journal of Alloys and Compounds 563 (2013) p. 216-220.

\* cited by examiner

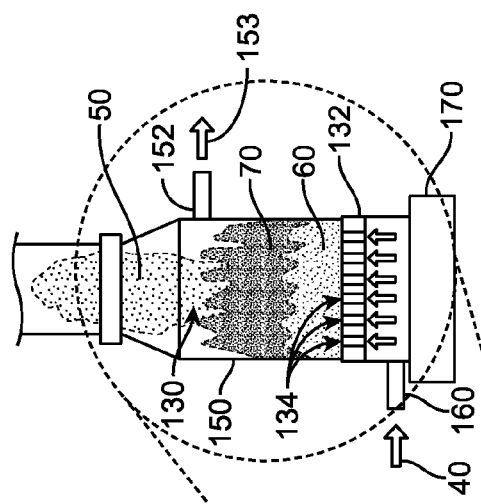
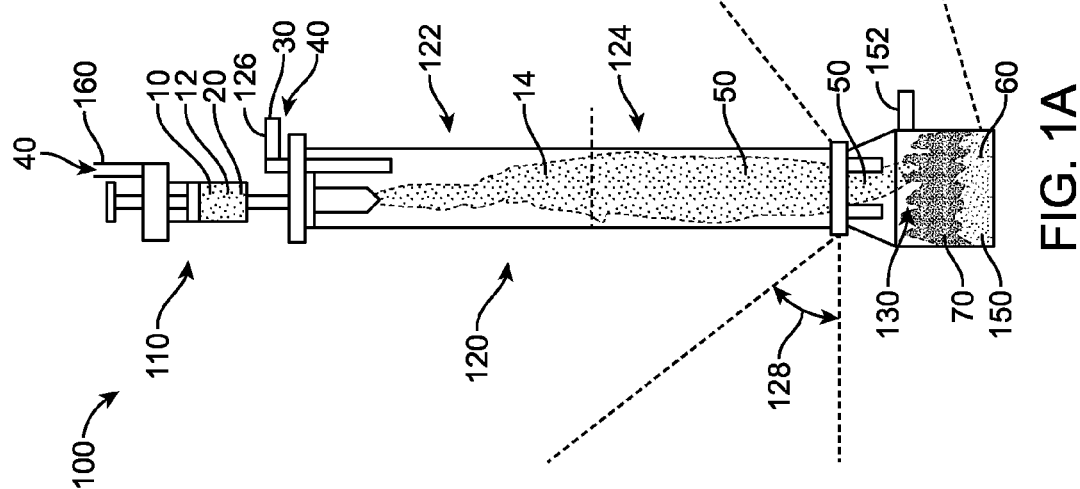
FIG. 1A
FIG. 1B

METHODS AND APPARATUSES FOR PRODUCING DISPERSED NANOSTRUCTURES

CROSS REFERENCE TO RELATED APPLICATIONS

This application claims the benefit of U.S. Provisional Application No. 62/053,044 filed Sep. 19, 2014 and U.S. Provisional Application No. 62/098,267, filed Dec. 30, 2014 which are incorporated herein by reference in their entirety for all purposes.

BACKGROUND

Carbon nanostructures have distinct electrical, thermal and mechanical properties that are desirable for use in structural applications as well as in electrically and thermally conducting functional materials. Carbon nanostructures have been combined with matrix or other materials to provide carbon nanostructure-reinforced composite materials having enhanced properties relative to the corresponding non-composite materials. Carbon nanostructure-reinforced composite materials are being used as, amongst other things, lightweight, rigid and high-strength materials. There is a need in the art for improved methods for preparing carbon nanostructure-reinforced composite materials having these superior properties.

SUMMARY

The present disclosure provides methods and apparatuses for the production of homogeneous dispersions of nanostructures within a matrix for precursors of carbon-reinforced or boron nitride-reinforced composite materials. Also provided are dispersions of nanostructures and composite materials formed from nanostructure dispersions.

In various aspects, the present disclosure provides methods for producing nanostructure dispersions. In some aspects, the methods comprise providing a reactor and a mixing chamber, wherein the reactor is in fluidic communication with the mixing chamber. In some aspects, the methods further comprise producing an aerosol of nanostructures in the reactor and providing a matrix material in the mixing chamber, wherein the matrix material may be a solid powder or a liquid. The method further comprises transferring the aerosol of nanostructures from the reactor to the mixing chamber, and dispersing the aerosol of nanostructures into the matrix material, thereby producing a nanostructure dispersion.

In some embodiments, the method may further comprise producing an aerosol of matrix particles from the matrix material, and providing the aerosol of matrix particles in the mixing chamber. The aerosol of nanostructures may then be dispersed into the aerosol of matrix particles, thereby producing a fine dispersion of nanostructures in the matrix material.

The aerosol of nanostructures may be transferred directly from the reactor to the mixing chamber. In the mixing chamber, the aerosol of nanostructures may be dispersed into the matrix material by a mechanical stirrer, a magnetic stirrer, ball miller, a sonicator, or a combination thereof. The nanostructure dispersion may be transferred to a collector, optionally as an aerosol.

In some embodiments, the method may further comprise providing a matrix tank in fluidic communication with the mixing chamber. The matrix tank can comprise the matrix material, and the matrix material may be transferred from the matrix tank to the mixing chamber. In some embodiments, the matrix material in the matrix tank may be fluidized to form an aerosol of matrix particles, prior to being transferred to the mixing chamber. The aerosol of matrix particles may be transferred to the mixing chamber by a tangential vortex, wherein the vortex is created by a tangential injection of a second carrier gas into the matrix tank.

The method may further comprise providing an injector in fluidic communication with the reactor. The injector may be used to introduce a catalyst into the reactor. The catalyst may be introduced as a liquid, spray, or aerosol, and may comprise a plurality of colloidal particles. In some embodiments, the injector may be used to introduce a catalyst precursor, a promoter, or a combination thereof, wherein the catalyst precursor may form active catalyst particles in the reactor.

The different structural elements used in the methods described herein may be arranged in various configurations. For example, the matrix tank may be positioned below the mixing chamber and above or below the reactor. The injector may be positioned above or below the reactor. The mixing chamber may be positioned above or below the reactor. The reactor and the mixing chamber may be positioned at various angles relative to one another. For example, the reactor may be positioned at any angle in the range from about 0° to about 180° relative to the mixing chamber.

The reactor may comprise a catalyst particle growth zone and a nanostructure growth zone. The reactor may produce a plurality of catalyst particles in the catalyst particle growth zone, wherein the catalyst particles may have a mean diameter in the range from about 0.5 nm to about 100 nm. The catalyst particles may comprise a transition metal, and may be supported on a catalyst support that may be the same as or different from the matrix material.

The method may further comprise introducing a carbon precursor into the reactor, wherein the carbon precursor may be decomposed to produce the aerosol of nanostructures. The carbon precursor may be mixed with a first carrier gas prior to being introduced into the reactor, wherein the first carrier gas may be an inert gas. The decomposition of the carbon precursor to produce the aerosol of nanostructures may take place at the plurality of catalyst particles produced in the catalyst particle growth zone of the reactor. The decomposition may be thermal or catalytic decomposition.

In some embodiments, the method may further comprise providing a plurality of pores through the base of the mixing chamber, introducing a second carrier gas into the mixing chamber through the pores, and producing an aerosol of matrix particles in the second carrier gas. The aerosol of matrix particles may also be produced in the mixing chamber by applying a tangential vortex to or vertically shaking the mixing chamber, or by a combination of all named ways.

The nanostructure dispersion produced by the methods described herein may be a homogeneous mixture, wherein the mixture may comprise a plurality of individual nanostructures, a plurality of non-individual nanostructures comprising a plurality of nanostructure bundles, or a combination thereof. The nanostructures may be one or more of many types of nanostructures, including carbon nanotubes and carbon fibers. The carbon nanotubes may be single-walled carbon nanotubes or multi-walled carbon nanotubes.

In some embodiments, the nanostructure dispersion may be continuously produced. In embodiments comprising a matrix tank, the method may further comprise continuously transferring the aerosol of nanostructures from the reactor to the mixing chamber, and continuously transferring the matrix material from the tank to the mixing chamber.

Aspects of the disclosure further provide a method for continuously producing a nanostructure dispersion. The method comprises providing a reactor and a mixing chamber in fluidic communication with one another, continuously producing an aerosol of nanostructures in the reactor, and continuously providing a matrix material in the mixing chamber. The method further comprises continuously transferring the aerosol of nanostructures from the reactor to the mixing chamber, and dispersing the aerosol of nanostructures into the matrix material, thereby producing a nanostructure dispersion.

In some embodiments, the method may further comprise continuously producing an aerosol of matrix particles from the matrix material, continuously providing the aerosol of matrix particles in the mixing chamber, and dispersing the aerosol of nanostructures into the matrix material comprising the aerosol of matrix particles.

The nanostructure synthesis reaction may be performed at any temperature in the range from about 200° C. to about 1600° C. The reactor may be configured to be held at two or more different temperatures. For example, the catalyst particle growth zone may be configured to be held at a temperature in the range from about 400° C. to 1000° C., and the nanostructure growth zone may be configured to be held at a temperature in the range from about 800° C. to about 1300° C. The rate of flow of the second carrier gas may be selected from about 100 sccm to about 5000 sccm. The rate of production of the aerosol of nanostructures may be held constant at a rate from about 0.1 g/hr to about 100 g/hr, while the mass percent of the nanostructures in the dispersion may be controlled modulating either the quantity of matrix material provided to the mixing chamber or the duration of the production of the aerosol of nanostructures.

Aspects of the present disclosure also provide a nanostructure dispersion produced by the methods described herein, and a composite material comprising the nanostructure dispersion produced by the methods described herein.

Aspects of the disclosure further provide an apparatus for producing a nanostructure dispersion. The apparatus comprises a reactor, an injector in fluidic communication with the reactor, a mixing chamber in fluidic communication with the reactor, a matrix tank in fluidic communication with the mixing chamber, and a collector in fluidic communication with the mixing chamber. The injector may further comprise a gas inlet for introducing a first carrier gas, and the matrix tank may further comprise a gas inlet for introducing a second carrier gas. The mixing chamber may further comprise a mechanical stirrer, a magnetic stirrer, a ball miller, a sonicator, or a combination thereof. In some embodiments, the apparatus may be capable of transferring an aerosol directly from the mixing chamber to the collector. The apparatus may further be capable of continuously producing the nanostructure dispersion.

The different structural elements of the apparatus described herein may be arranged in various configurations. For example, the matrix tank may be positioned below the mixing chamber and above or below the reactor. The injector may be positioned above or below the reactor. The mixing chamber may be positioned above or below the reactor. The reactor and the mixing chamber may be positioned at various angles relative to one another. For example, the reactor may be positioned at any angle in the range from about 0° to about 180° relative to the mixing chamber.

The reactor may further comprise a catalyst particle growth zone and a nanostructure growth zone. The reactor may further comprise a carbon precursor, wherein the carbon precursor can form a carbon nanostructure in the reactor. The reactor may further comprise a plurality of catalyst particles produced in the catalyst particle growth zone of the reactor. The catalyst particles may be supported on a catalyst support. The mixing chamber may further comprise a plurality of pores in the base.

Aspects of the disclosure also provide a nanostructure dispersion produced by the apparatus described herein, and a composite material comprising the nanostructure dispersion produced by the apparatus described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative aspects, in which the principles of the disclosure are utilized, and the accompanying drawings of which:

FIG. 1A illustrates an apparatus for producing dispersed carbon nanostructures, in accordance with embodiments of the present disclosure.

FIG. 1B shows an expanded view of the mixing chamber and collector of the apparatus of FIG. 1A.

FIG. 2 illustrates an alternative embodiment of the apparatus of FIG. 1.

FIG. 3 illustrates an alternative embodiment of the apparatus of FIG. 2, in which dispersions of nanoparticles are produced continuously.

DETAILED DESCRIPTION

The present disclosure provides methods and apparatuses for the production of homogeneous dispersions of carbon nanostructures within matrix materials as precursors of carbon-reinforced composite materials. In certain aspects, the present disclosure provides methods and apparatuses for the continuous production of carbon nanostructures. Also provided are dispersions of nanostructures and composite materials formed from nanostructure dispersions. In various aspects, the production of a homogenous dispersion of carbon nanostructures relates to the act of mixing the components that form the homogenous dispersion, thereby producing the homogenous dispersion.

Production of carbon nanostructure-reinforced composite materials having controlled quantities of homogeneously dispersed carbon nanostructures has proved challenging. Many of the dispersion methods currently in use result in high levels of agglomeration or bundling of the carbon nanostructures within the carbon nanostructure-reinforced composite materials. This effect is due, in part, to the high aspect ratios of carbon nanostructures. Excessive agglomeration or bundling reduces the degree of dispersion of carbon nanostructures and thus, requires higher loading of carbon nanostructures in the materials to create a carbon nanostructure-reinforced composite materials with the desired properties. In addition, the dispersion techniques currently used have been shown to damage the structure of carbon nanostructures, thereby reducing the quality of the carbon nanostructure-reinforced composite materials. The methods and apparatuses of the present disclosure advantageously enable the controlled production of high-quality homogeneous dispersions of carbon nanostructures. The nanostructures and composites produced therefrom of the present disclosure have superior electrical, thermal and mechanical properties relative to those produced by other known methods. Moreover, the resulting composites have a lower overall cost because smaller quantities carbon nanostructures can be used relative to existing carbon nanostructure composites having lower levels of dispersion.

A better understanding of the features and advantages of the present disclosure will be obtained by reference to the following detailed description that sets forth illustrative embodiments, in which the principles of embodiments of the invention are utilized, and the accompanying drawings.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as described herein.

The use of the terms "a" and "an" and "the" and similar referents in the context of describing the disclosure are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context.

All ranges disclosed herein are inclusive of the endpoints, and the endpoints are independently combinable with each other. The suffix "(s)" as used herein is intended to include both the singular and the plural of the term that it modifies, thereby including at least one of that term. "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

As used herein, A and/or B encompasses A, or B, and combinations thereof.

As used herein like characters and numerals identify like elements.

The present disclosure provides methods and apparatuses for the production of homogeneous dispersions of carbon nanostructures within a matrix for precursors of carbon-reinforced composite materials. The carbon nanostructure-reinforced composite materials include a matrix with a homogeneous dispersion of carbon nanostructures throughout the matrix. The homogeneous dispersions of carbon nanostructures within the matrix provides enhanced material properties of precursors for carbon-reinforced composite materials compared to material properties of matrix alone or material properties of heterogeneous dispersions of carbon nanostructures in the absence of matrix. Due to the properties of carbon nanostructures, including mechanical strength, hardness, kinetic, electrical, optical and thermal properties, small amounts of carbon nanostructures can be combined with the matrix to generate carbon-reinforced composite materials providing enhanced durability and wear resistance compared to materials comprising the matrix alone. In some aspects, the methods and apparatuses described herein are used on a large scale for large-scale production of homogeneous dispersions of carbon nanostructures within a matrix for subsequent use as precursors of carbon-reinforced composite materials.

Apparatuses and Methods for Producing Dispersed Nanostructures

FIG. 1A illustrates an apparatus 100 for producing dispersed carbon nanostructures 70, in accordance with embodiments of the present disclosure. According to this aspect, the apparatus comprises an injector 110, a reactor 120, a mixing chamber 130, and optionally a collector 150. The injector is in fluidic communication with the reactor, the reactor is in fluidic communication with the mixing chamber, and the mixing chamber is in fluidic communication with the collector. A catalyst 10 or catalyst precursor 12 can be provided to the injector 110, and then injected into the reactor 120 by the injector 110. Optionally, a promoter 20 of the catalyst is also injected into the reactor. In some aspects, the reactor comprises a carbon precursor inlet 126, through which a carbon precursor 30 may be introduced into the reactor 120. In certain aspects, the reactor 120 comprises a catalyst particle growth zone 122, a nanostructure growth zone 124, or a combination thereof. In some aspects, the catalyst or catalyst precursor forms catalyst particles 14 in the catalyst particle growth zone 122 of the reactor. According to this aspect, the catalyst particles then move to the nanostructure growth zone 124 of the reactor via a carrier gas 40. In some aspects, the carrier gas 40 is introduced into the reactor via a gas inlet 160 of the injector, or via the carbon precursor inlet 126, where the carrier gas can be mixed with the carbon precursor 30 prior to being introduced into the reactor. In some aspects, the carrier gas 40 passes into the apparatus 100 through the gas inlet 160 of the injector, passes through the reactor 120 and exits the apparatus through the gas outlet 152. In further aspects, the carrier gas 40 is a first carrier gas. In the nanostructure growth zone 124, the catalyst particles 14 may react with the carbon precursors 30 to form an aerosol of carbon nanostructures 50. The nanostructures can then move to the mixing chamber via the carrier gas.

FIG. 1B shows an expanded view of the mixing chamber 130 and collector 150 of the apparatus 100 of FIG. 1A. A matrix material 60 is provided in the mixing chamber, where the matrix material may comprise a solid powder, a liquid, or any other suitable matrix material for dispersing carbon nanostructures. As the aerosol of carbon nanostructures 50 enters the mixing chamber from the reactor 120, the nanostructures can disperse into the matrix material 60, thereby producing a nanostructure dispersion 70. In some aspects, the matrix material is fluidized in the mixing chamber 130, so as to provide a fine dispersion 70 of the nanostructures 50 in the matrix material 60. In some aspects, the mixing chamber 130 comprises a mixer 170 and a base 132, wherein the base comprises a plurality of pores 134. According to some aspects, the carrier gas 40 is provided through a gas inlet 160 of the mixing chamber. According to this aspect, the carrier gas 40 enters the mixing chamber 130 through the plurality of pores 134 and mixes with the matrix material 60 via the action of the mixer 170. In various aspects, the mixer 170 comprises a mechanical stirrer, a magnetic stirrer, a ball miller, a sonicator, or a combination thereof. In some aspects, the matrix material 60 is fluidized by the carrier gas 40 and the action of the mixer 170, to form an aerosol of matrix particles. As the aerosol of carbon nanostructures 50 enters the mixing chamber 130 from the reactor 120, the nanostructures instantly disperse in the aerosol of matrix particles, resulting in a homogeneous dispersion of nanostructures 70 within the matrix. The mixing chamber 130 is optionally contained within the collector 150. In some aspects, the collector comprises a gas outlet 152 through which exhaust gases 153 may exit. In some aspects, the exhaust gases comprise the carrier gas 40.

FIG. 2 illustrates an alternative embodiment of the apparatus 100 of FIG. 1. The apparatus 200 comprises many of the structures of apparatus 100, including the injector 110, reactor 120, mixing chamber 130, and collector 150. The apparatus 200 further comprises a matrix tank 240 in fluidic communication with the mixing chamber 130, where the mixing chamber is contained within and in fluidic communication with the collector 150. In some aspects, the matrix material 60 is provided in the matrix tank 240 and the matrix material 60 is delivered into the mixing chamber 130 at a controlled rate. The aerosol of nanostructures 50 entering the mixing chamber 130 from the reactor 120 can then disperse into the matrix material 60, forming a dispersion of nanostructures 70 in the matrix 60. In order to create a fine dispersion of the nanostructures in the matrix, the matrix material 60 can be fluidized prior to being introduced into the mixing chamber. In some aspects, the fluidization of the matrix material is achieved in a similar manner as described for the mixing chamber of FIG. 1. In certain aspects, the matrix tank 240 comprises a base 242 having a plurality of pores 244, a mixer 170, a gas inlet 160, and a tangential injector 180. According to this aspect, the matrix material 60 is fluidized by a carrier gas 40 introduced into the matrix tank through the gas inlet 160, optionally in combination with the action of the mixer 170 that acts on the matrix 60 to further fluidize the matrix. In some aspects, the mixer 170 comprises a mechanical stirrer, a magnetic stirrer, a ball miller, a sonicator, or a combination thereof. In order to carry the fluidized matrix particles 62 into the mixing chamber 130, a carrier gas 40 can also be injected through the tangential injector 180, resulting in the formation of vortexes 64 of the fluidized matrix particles 62. According to this aspect, the vortexes 64 carry the matrix particles 62 into the mixing chamber 130 in a finely dispersed form, so that the nanostructures 50 entering the mixing chamber from the reactor 120 are finely dispersed within the matrix particles 62. In some aspects, the carrier gas 40 is a second carrier gas when used to fluidize the matrix material 60. The matrix tank 240 enables control over the injection rate of the matrix particles 62 into the mixing chamber 130. The ability to control the injection rate of the matrix particles 62 into the mixing chamber 130, in addition to the injection rate of the nanostructures 50 into the mixing chamber 130, allows improved control over the loading ratio of the nanostructures 50 into the matrix 62. The user can control the loading ratio by tuning the injection rates for the nanostructures 50 and matrix material 60.

Figure 3:
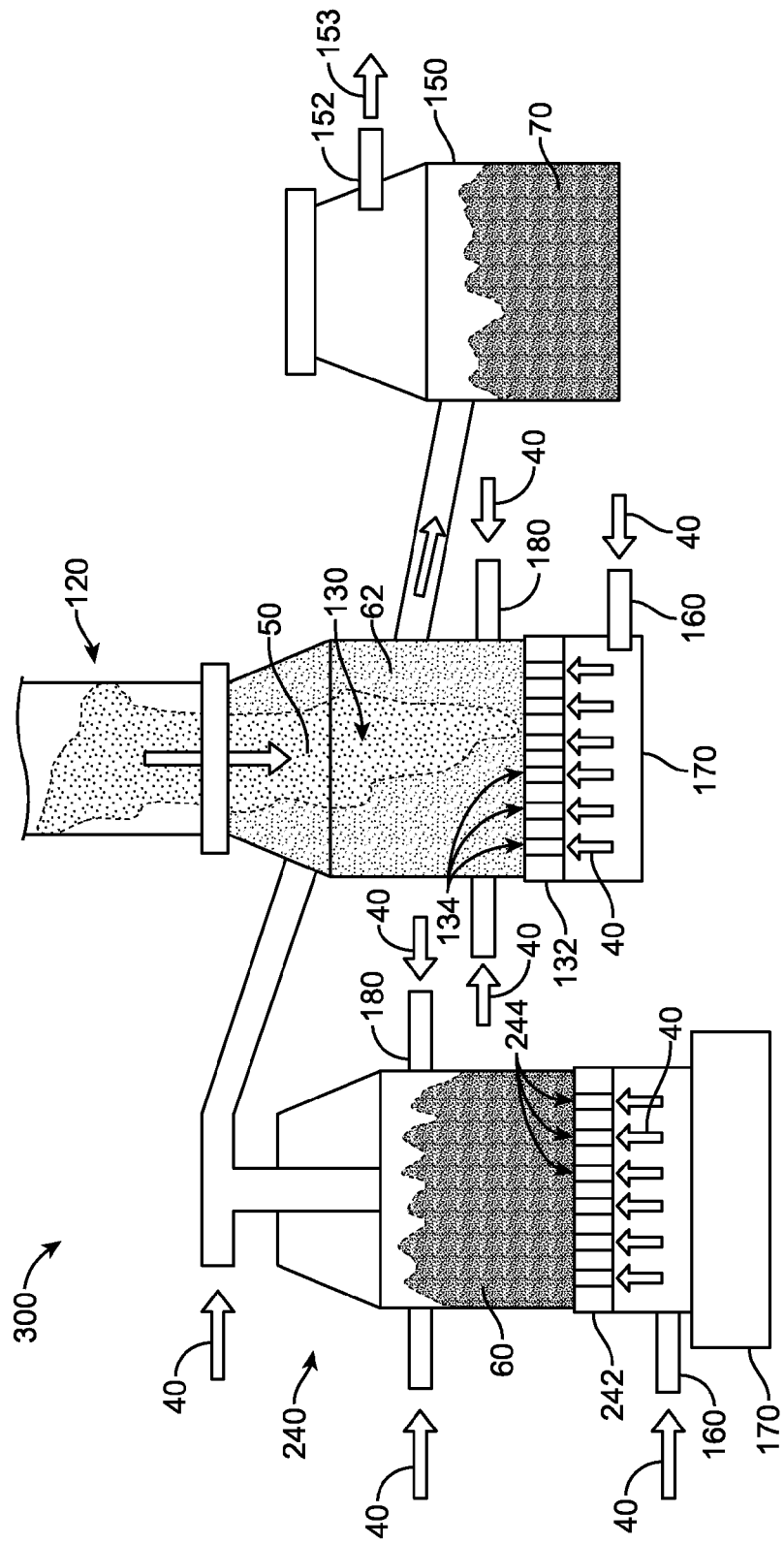

FIG. 3 illustrates an alternative embodiment of the apparatus 200 of FIG. 2, which is capable of continuously producing dispersed carbon nanostructures. Apparatus 300 comprises many of the structures of apparatus 200, including the injector 110, reactor 120, mixing chamber 130, collector 150, and matrix tank 240. In this aspect, the mixing chamber 130 and the collector 150 of apparatus 300 are separately contained, but in fluidic communication with one another. In some aspects, the matrix tank 240 comprises a mixer 170, a base 242 having a plurality of pores 244, a gas inlet 160 through which a carrier gas 40 can be introduced into the mixing chamber 130, and a tangential injector 180, as described herein. In various aspects, a matrix material 60 is provided in the matrix tank 240, after which it is transferred directly to the mixing chamber 130. In other aspects, the matrix material 60 is fluidized and finely dispersed in a vortex 64 prior to being introduced into the mixing chamber 130, as described herein. In some aspects, the vortex 64 carrying the fluidized matrix particles 62 enters the mixing chamber 130 from the matrix tank 240. In various aspects, an aerosol of nanostructures 50 concurrently enters the mixing chamber 130 from the reactor 120. In some aspects, the mixing chamber comprises a base 132 having a plurality of pores 134, a mixer 170, and a gas inlet 160, as described herein. In some aspects, a carrier gas 40, injected through the gas inlet 160, enters the mixing chamber 130 through the plurality of pores 134 and disperses the nanoparticles 50 in the matrix particles 62 via the action of the mixer 170. In certain aspects, the mixing chamber 130 further comprises a tangential injector 180, wherein the tangential injection of the carrier gas 40 organizes the nanostructure dispersion 70 into a vortex 64, and the vortex carries the nanostructure dispersion 70 into the collector 150.

In various aspects, the apparatus 300 is configured for continuous production of nanostructure dispersions 70. When operated in a continuous production mode, the apparatus 300 continuously produces an aerosol of nanostructures 50 in the reactor 120, which is then continuously transferred from the reactor 120 to the mixing chamber 130. When operated in a continuous production mode, aerosols of matrix particles 62 are continuously transferred from the matrix tank 240 into the mixing chamber 130. When operated in a continuous production mode, the finely dispersed carbon nanostructures 70 (i.e., a disperse mixture of the nanostructures 50 and the matrix particles 62) can be transferred continuously into a collector 150.

The structural features of the apparatuses described herein can be arranged in any manner suitable for production of carbon nanostructure dispersions according to the present disclosure. In various aspects, the matrix tank is positioned below the mixing chamber. In further aspects, the matrix tank is positioned above the reactor. In other aspects, the matrix tank is positioned below the reactor. In other aspects, the injector is positioned above the reactor. In some aspects, the injector is positioned below the reactor. In further aspects, the mixing chamber is positioned above the reactor. In still further aspects, the mixing chamber is positioned below the reactor.

Various positions of the reactor with respect to the mixing chamber are contemplated. Referring to FIG. 1, angle 128 is defined as the angle between the horizontal axis of the mixing chamber 130 and the vertical or lateral axis of the reactor 120. Angle 128 may be within a range from about 0° to about 180°. For example, the reactor may be positioned at an angle of from 0 to 180° relative to the mixing chamber, the reactor may be positioned at an angle of from 0 to 150° relative to the mixing chamber, the reactor may be positioned at an angle of from 0 to 120° relative to the mixing chamber, the reactor may be positioned at an angle of from 20 to 180° relative to the mixing chamber, the reactor may be positioned at an angle of from 20 to 150° relative to the mixing chamber, the reactor may be positioned at an angle of from 20 to 120° relative to the mixing chamber, the reactor may be positioned at an angle of from 20 to 90° relative to the mixing chamber, the reactor may be positioned at an angle of from 40 to 180° relative to the mixing chamber, the reactor may be positioned at an angle of from 40 to 150° relative to the mixing chamber, the reactor may be positioned at an angle of from 40 to 120° relative to the mixing chamber, the reactor may be positioned at an angle of from 40 to 90° relative to the mixing chamber, the reactor may be positioned at an angle of from 60 to 180° relative to the mixing chamber, the reactor may be positioned at an angle of from 60 to 150° relative to the mixing chamber, the reactor may be positioned at an angle of from 60 to 120° relative to the mixing chamber, or the reactor may be positioned at an angle of from 60 to 90° relative to the mixing chamber.

These configurations are provided by way of example only, and many other suitable configuration can be used according to the present disclosure.

Carbon Nanostructures

The present disclosure provides methods and apparatuses for producing disperse carbon nanostructures as well as disperse nanostructures and composites comprising those disperse nanostructures. Any carbon nanostructure capable of being dispersed in a matrix material can be used according to the present disclosure.

Exemplary carbon nanostructures according to the present disclosure include nanoparticles, nanotubes, multiwall nanotubes, fullerenes, nanowires, nanodots, nanorods, sheets, carbon onions, carbon black, carbon horns, activated carbon, hard carbon, soft carbon.graphene including nanographene and graphene fiber, nanographite, alkane, alkene, alkyne, benzene, metal, metal oxide, nanodiamonds, polysilsesquioxanes, inorganic nanoparticles including silica nanoparticles, nanoclays, metal nanoparticles, or combinations thereof.

In some aspects, the carbon nanostructures are fullerenes. Fullerenes include any cage-like hollow allotropic forms of carbon with a polyhedral structure. In some aspects, fullerenes include structures having from about 20 to about 100 carbon atoms. For example, fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

In various aspects of the present disclosure, the carbon nanostructures are carbon nanotubes. Nanotubes, for example single-walled nanotubes or multi-walled nanotubes, are tubular fullerene structures having open or closed ends. Nanotubes may be entirely carbon, or they made be substituted, that is, have non-carbon lattice atoms. Carbon nanotubes may be externally derivatized to include one or more functional moieties at a side and/or an end location. In some aspects, carbon and inorganic nanotubes include additional components such as metals or metalloids, incorporated into the structure of the nanotube. In certain aspects, the additional components are a dopant, a surface coating, or are a combination thereof.

Nanotubes may be metallic, semimetallic, or semi-conducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "arm-chair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The nanotubes may range in length from about 50 nm to about 10 cm or greater.

Carbon nanotubes, particularly single-walled carbon nanotubes, have many properties that make them valuable materials for various applications. Single-walled carbon nanotubes have high tensile strength, with a generally accepted value being approximately 30 GPa. Single-walled nanotubes can have thermal conductivity values as high as 6,600 W/m-K, and can carry current densities on the order of $10^9$ amp/cm$^2$.

In some aspects of the present disclosure, the carbon nanostructure material comprises nanographite. Nanographite is a stack of sheets, or often layers, of graphite, with a plate-like two-dimensional structure of fused hexagonal rings with an extended delocalized i-electron system. Often nanographite includes at least one layer that is weakly bonded to another layer. In some cases, nanographite has micro- and nano-scale dimensions, for example an average particle size of about 1 to about 20 µm, about 1 to about 15 µm, and an average thickness of less than about 1 µm, less than or equal to about 700 nm or less than or equal to about 500 nm.

In some aspects, the carbon nanostructure material includes graphene. For example, graphene includes nanographene and graphene fibers which are often graphene particles having an average largest dimension of greater than about 1 µm, a second dimension of less than about 1 µm, and an aspect ratio of greater than about 10, and the graphene particles form an inter-bonded chain. Graphene and nanographene are, for example, two-dimensional particles of nominal thickness, of one, or more than one layers of fused hexagonal rings with an extended delocalized π-electron system. When more than one graphene layer is present, the layers are weakly bonded to one another through π-π stacking interactions. Graphene and nanographene is often a single sheet or a stack of several sheets having both micro- and nano-scale dimensions. In some aspects, graphene has an average particle size of about 1 to about 20 µm, about 1 to about 15 µm, and an average thickness dimension of less than or equal to about 50 nm, less than or equal to about 25 nm, or less than or equal to about 10 nm. For example, graphene has an average particle size of about 1 to about 5 µm, or about 2 to about 4 µm. In some aspects, smaller nanoparticles are combined with nanoparticles having an average particle size of greater than or equal to about 1 µm. In other aspects, the nanostructure is a derivatized graphene. Graphene, including nanographene, is prepared for example by, exfoliation of nanographite or by a synthetic procedure by "unzipping" a nanotube to form a nanographene ribbon, followed by derivatization of the nanographene to prepare nanographene oxide. Exfoliation to form graphene or nanographene is carried out by exfoliation of a graphite source such as graphite, intercalated graphite, and nanographite including, for example, fluorination, acid intercalation, acid intercalation followed by high temperature treatment, and the like, or a combination of the above. In some aspects, exfoliated nanographene has fewer than about 50 single sheet layers, fewer than about 20 single sheet layers, fewer than about 10 single sheet layers, and fewer than about 5 single sheet layers.

In some aspects, the carbon nanostructure material includes a nanodiamond. A nanodiamond is a diamond particle having an average particle size of less than about 1 µm. Nanodiamonds are from a naturally occurring source or a synthetic source. For example, a naturally occurring source includes as a by-product of milling or other processing of natural diamond. For example, a synthetic source includes preparation by any suitable commercial method.

In some aspects, the carbon nanostructure material includes polysilsesquioxanes. Often, polysilsesquioxanes, are referred to as polyorganosilsesquioxanes or polyhedral oligomeric silsesquioxanes (POSS) derivatives and are polyorganosilicon oxide compounds. In some aspects, polysilsesquioxanes are of the general formula RSiO1.5 (where R is an organic group such as methyl) having defined closed or open cage structures (closo or nido structures).

In some aspects, the carbon nanostructure material includes nanoclays. Nanoclays are hydrated or anhydrous silicate minerals with a layered structure and include, for example, alumino-silicate clays such as kaolins including hallyosite, smectites including montmorillonite, illite, and CLOISITE®. Often, nanoclays are exfoliated to separate individual sheets, or are non-exfoliated, and further, are dehydrated or included as hydrated minerals. Other nano-sized mineral fillers of similar structure are also included such as, for example, talc, micas including muscovite, phlogopite, or phengite, or the like.

In certain aspects, the carbon nanostructures are derivatized to include a variety of different functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like. In some aspects, the carbon nanostructure is functionalized to include a hydrophilic functional group including hydroxy, carboxylic acid, amine, lactone, polyethylene glycol, a hydrophilic polymer, ionic groups such as ammonium groups and/or carboxylate salt groups, or a combination of the above. In another aspect, carbon nanostructures include a combination of derivatized carbon nanostructures and underivatized carbon nanostructures.

Carbon nanostructures may comprise particles with an average particle size, in at least one dimension, of less than one micrometer (μm). Particle size, including average, maximum, and minimum particle sizes, can be determined using a method known to one of skill in the art, for example, by a method of determining the size of particles such as, for example, static or dynamic light scattering (SLS or DLS) using a laser light source. In some cases, carbon nanostructures include both particles having an average particle size of 250 nanometers (nm) or less, and particles having an average particle size of greater than 250 nm to less than 1 μm. In some aspects, a nanostructure has an average particle size of about 0.01 to about 500 nm, about 0.05 to about 250 nm, about 0.1 to about 150 nm, and about 1 to about 75 nm. Carbon nanostructures generated using the methods described herein are monodisperse, and are of about the same size, or polydisperse, where the carbon nanostructures are of a range of sizes and the reported size is an average of the carbon nanostructures. Often, polydisperse nanostructures are used with the methods described herein. In other aspects, carbon nanostructures of different average sizes are used such that the size distribution of the carbon nanostructures is unimodal, for example, exhibiting a single distribution, bimodal, for example, exhibiting two distributions, or multi-modal, for example, exhibiting more than one particle size distribution. In some aspects, the minimum size of the carbon nanostructures is less than about 0.05 nm, less than or equal to about 0.02 nm, or less than or equal to about 0.01 nm. The maximum size of the carbon nanostructures is greater than or equal to about 900 nm, greater than or equal to about 750 nm or greater than or equal to 500 nm. The carbon nanostructures often have a high surface area of greater than about 180 $m^2/g$, about 300 $m^2/g$ to about 1800 $m^2/g$ or about 500 $m^2/g$ to 1500 $m^2/g$.

Boron Nitride Nanostructures

The present disclosure provides methods and apparatuses for producing disperse boron nitride nanostructures as well as disperse nanostructures and composites comprising those disperse nanostructures. Any boron nitride nanostructure capable of being dispersed in a matrix material can be used according to the present disclosure.

In various aspects, the disperse nanostructures of the present disclosure are boron nitride nanotubes (BNNTs). In some aspects, the BNNTs are one-dimensional nanostructures made up of hexagonal B—N bonding networks, which are structural analogues of carbon nanotubes (CNTs). While the nature of the C—C bond in CNTs is purely covalent, the B—N bond has partial ionic character due to the differences in electronegativity of boron and nitrogen, resulting in BNNTs being electrically insulating with a band gap of ~5-6 eV that is insensitive to tube diameter, number of walls and chirality. BNNTs exhibit high chemical stability, thermal stability (up to 800° C. in air), excellent thermal conductivity, very high Young's modulus (up to 1.3 TPa), piezoelectricity, the ability to suppress thermal neutron radiation, and superhydrophobicity (as a matted fabric). These properties make them ideal candidates as protective shields/capsules, mechanical and/or thermal reinforcement for polymers, ceramics and metals, self-cleaning materials and for biology/medicine applications.

BNNTs can be synthesized using a variety of methods including laser ablation, arc discharge, chemical vapor deposition, mechanothermal methods, and the like. In some aspects of the present disclosure, BNNTs are produced by the floating catalyst technique using ferrocene or nickelocene as catalysts and borazine or decaborane as precursors. Other precursors can be used for CVD growth including: diborane, trimethyl borate, elemental boron, iron boride, boric acid and boron tribromide, with or without ammonia and/or $N_2$ gas. Also, boron oxide gas formed from the reaction of boron with a metal oxide ($SiO_2$, MgO, FeO, $Li_2O$, and the like) can be used as precursor. In other aspects, catalysts for CVD growth of BNNTs include: $Ni_2B$, Co, Ni, NiB, Fe, Fe oxides, Ni oxides, and the like.

Like CNTs, BNNTs suffer from severe bundling during their growth, resulting in aggregation and poor dispersion. Thus, in order to realize their potential in BNNT-reinforced composites, it is beneficial to first debundle and disperse the nanotubes. Existing methods rely on sonication in solvents, ball milling, mechanical mixing or functionalization.

In various aspects, the above-described methods for production and dispersion of CNTs can be applied to BNNTs. For example, in some aspects, the methods used for mixing pristine CNTs with an aerosolized matrix can be used for BNNTs. In various aspects, the plume of BNNTs is grown using a floating catalyst in which the catalyst is mixed with an aerosolized matrix as they exit the growth rector. Using this method, the continuous, homogeneous and in situ incorporation of pristine BNNTs into a matrix is achieved, with reduced agglomeration and bundling and precise control over loading amounts.

Catalyst Materials

In various embodiments, the present disclosure provides catalyst particles or catalyst precursors for the production of carbon nanostructures. In various aspects, the catalyst particles are present as an aerosol. In some aspects, the catalyst materials are supplied as nanoparticles, comprising a transition metal, a lanthanide metal, or an actinide metal. For example, the catalyst may comprise a Group VI transition metal such as chromium (Cr), molybdenum (Mo), and tungsten (W), or a Group VIII transition metal such as iron (Fe), cobalt (Co), nickel (Ni), ruthenium (Ru), rhodium (Rh), palladium (Pd), osmium (Os), Iridium (Ir), and platinum (Pt). In some aspects, a combination of two or more metals are used, for example an iron, nickel, and cobalt mixture or more specifically a 50:50 mixture (by weight) of nickel and cobalt. The catalyst may comprise a pure metal, a metal oxide, a metal carbide, a nitrate salt of a metal, and/or other compounds containing one or more of the metals described herein. The catalyst may be added to the reactor at about 0.1 atom % to about 10 atom %, where atom % indicates the percentage of the number of catalyst atoms with respect to the total number of atoms in the reactor (catalyst and carbon precursor atoms).

Alternatively or in combination, a catalyst precursor may be introduced, wherein the catalyst precursor can be converted to an active catalyst under the reactor's conditions. The catalyst precursor may comprise one or more transition metal salts such as a transition metal nitrate, a transition metal acetate, a transition metal citrate, a transition metal chloride, a transition metal fluoride, a transition metal bromide, a transition metal iodide, or hydrates thereof. For example, the catalyst precursor may be a metallocene, a metal acetylacetonate, a metal phthalocyanine, a metal porphyrin, a metal salt, a metalorganic compound, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as Fe $(NO_3)_3$, Ni $(NO_3)_2$ or CO $(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

As described herein, catalyst according to the present disclosure can either be introduced into or formed within the reactor. In some aspects, the reactor comprises a catalyst particle growth zone, wherein the reactor can produce a plurality of catalyst particles from the catalyst or catalyst precursors provided to the reactor. The catalyst particles that form in the reactor may comprise a cluster of metal atoms containing from about 10 to about 200 atoms. The catalyst particles may have a mean diameter within a range from about 0.5 nm to about 100 nm. For example, the mean diameter of the plurality of catalyst particles may be from 0.5 nm to 100 nm, the mean diameter of the plurality of catalyst particles may be from 0.5 nm to 75 nm, the mean diameter of the plurality of catalyst particles may be from 0.5 nm to 50 nm, the mean diameter of the plurality of catalyst particles may be from 0.5 nm to 25 nm, the mean diameter of the plurality of catalyst particles may be from 0.5 nm to 20 nm, the mean diameter of the plurality of catalyst particles may be from 0.5 nm to 15 nm, the mean diameter of the plurality of catalyst particles may be from 0.5 nm to 10 nm, the mean diameter of the plurality of catalyst particles may be from 0.5 nm to 5 nm, the mean diameter of the plurality of catalyst particles may be from 0.5 nm to 4 nm, the mean diameter of the plurality of catalyst particles may be from 0.5 nm to 3.5 nm, the mean diameter of the plurality of catalyst particles may be from 0.5 nm to 3 nm, the mean diameter of the plurality of catalyst particles may be from 1 nm to 100 nm, the mean diameter of the plurality of catalyst particles may be from 1 nm to 75 nm, the mean diameter of the plurality of catalyst particles may be from 1 nm to 50 nm, the mean diameter of the plurality of catalyst particles may be from 1 nm to 25 nm, the mean diameter of the plurality of catalyst particles may be from 1 nm to 20 nm, the mean diameter of the plurality of catalyst particles may be from 1 nm to 15 nm, the mean diameter of the plurality of catalyst particles may be from 1 nm to 10 nm, the mean diameter of the plurality of catalyst particles may be from 1 nm to 5 nm, the mean diameter of the plurality of catalyst particles may be from 1 nm to 4 nm, the mean diameter of the plurality of catalyst particles may be from 1 nm to 3.5 nm, the mean diameter of the plurality of catalyst particles may be from 1 nm to 3 nm, the mean diameter of the plurality of catalyst particles may be from 5 nm to 20 nm, or the mean diameter of the plurality of catalyst particles may be from 0.8 nm to 3.5 nm.

The catalyst particles may comprise a transition metal, such as a d-block transition metal, an f-block transition metal, or a combination thereof. For example, the catalyst particles may comprise a d-block transition metal such as an iron, nickel, cobalt, gold, silver, or a combination thereof. The catalyst particles may be supported on a catalyst support, wherein the catalyst support may be selected from alumina, silica, zirconia, magnesia, or zeolites. For example, the catalyst support may be a nanoporous magnesium oxide support. The catalyst support may be the same or different from the material selected for the matrix. In order to have catalyst particles on a catalyst support, the catalyst support material may be introduced into the catalyst material prior to adding the catalyst to the reactor. For example, a solution of the catalyst material, such as a molybdenum/cobalt mixture, may be combined with a solution of magnesium nitrate, heated together, and then cooled to produce a catalyst on a nanoporous MgO support. Alternately, a silica support may be impregnated with cobalt nitrate and ammonium heptamolybdate and dried for several hours to produce a cobalt/molybdenum catalyst on a porous silica support.

Production of Nanostructures

In various aspects, aerosols of nanostructures are formed in a reactor by a method comprising introducing a catalyst or catalyst precursor and a carbon precursor into the reactor, as described herein. In various aspects of the present disclosure, carbon nanostructures are produced within the reactor by the reaction of a carbon precursor with a catalyst. In various aspects, a plurality of catalyst particles is provided in the reactor either by direct introduction of the catalyst particles into the reactor or by production of the catalyst particles within the reactor from a catalyst precursor. Catalyst particles that form in the reactor can decompose the carbon precursor to produce an aerosol of carbon nanostructures. A promoter may also be introduced into the reactor to promote the decomposition of the carbon precursors into carbon nanostructures.

The catalyst may be introduced into the reactor in the form of a liquid, spray, or aerosol, and may comprise a plurality of colloidal particles. The catalyst can convert a carbon precursor into highly mobile carbon radicals that can rearrange to form carbon nanostructures.

The plurality of catalyst particles can decompose the carbon precursor into a plurality of carbon nanostructures. The decomposition can be a thermal decomposition or a catalytic decomposition. Optionally, a promoter may also be added to promote the decomposition reaction. In some aspects, the promoter comprises a thiophene, carbon disulfide or other sulfur containing compound, tetrahydrofuran, dimethylformamide, dimethyl sulfoxide, or a combination thereof.

The carbon precursor may be a hydrocarbon, an alcohol, an ester, a ketone, an aromatic, an aldehyde, or a combination thereof. For example, the carbon precursor may be selected from a methane, ethane, acetylene, ethylene, ethanol, carbon monoxide, carbon dioxide, naphthalene, xylene, propane, butane, butene, butadiene, pentane, pentene, hexane, cyclohexane, benzene, or a combination thereof. The carbon precursor may be a carbon-containing gas or liquid. Carbon monoxide may also be used, and may be preferred when used in reactions with molybdenum-based nano-catalysts.

A first carrier gas can carry the carbon precursors through the reactor, allowing the carbon precursors to react with the catalyst particles to undergo decomposition and form the carbon nanostructures. The first carrier gas can also carry the synthesized carbon nanostructures into the mixing chamber. The first carrier gas may be introduced through the injector of the catalyst or catalyst precursor, or it may be pre-mixed with the carbon precursor and then introduced into the reactor via a carbon precursor inlet of the reactor.

In the methods described herein, both the catalyst particle production and the nanostructure production may occur within the reactor. A catalyst precursor may be reduced into active catalytic particles in the catalyst particle growth zone, then continue to travel towards the hotter nanostructure growth zone, where the decomposition of the carbon precursors into nanostructures can occur. As described herein, the reactor comprises a catalyst particle growth zone, wherein the reactor can produce a plurality of catalyst particles from the catalyst or catalyst precursors provided to the reactor.

In some aspects of the present disclosure, chemical vapor deposition (CVD) is used for the production of carbon nanostructures, resulting in a controlled and uniform synthesis of nanostructures. In various aspects, carbon nanostructures are produced within a reactor and at the surface of a plurality of catalyst particles. According to this method, a carbon precursor is introduced into a reactor along with a carrier gas, which is typically an inert gas. A catalyst, which can be introduced into the reactor as active catalytic particles or as precursors that can be converted into active catalytic particles in situ, can decompose the carbon precursor, initiating the growth of the nanostructure at the catalytic site.

As described herein, a carrier gas introduced into the apparatus can help carry the reactants and products from one structure of the apparatus or portion thereof to another. The carrier gas may be an inert gas, such as an argon gas, hydrogen gas, helium gas, nitrogen gas, or a combination thereof. A first carrier gas, introduced into the reactor via a gas inlet of the catalyst or catalyst precursor injector, can help carry the catalyst particles through the catalyst particle growth zone of the reactor, into the nanostructure growth zone.

The production of the nanostructures in the reactor may be controlled in many ways. The temperature in the reactor may be varied to optimize the efficiency of reactions or to control the rate of reactions. Producing an aerosol of nanostructures may be performed at a temperature selected from a temperature from 200° C. to 1600° C., producing an aerosol of nanostructures may be performed at a temperature selected from a temperature from 300° C. to 1600° C., producing an aerosol of nanostructures may be performed at a temperature selected from a temperature from 400° C. to 1600° C., producing an aerosol of nanostructures may be performed at a temperature selected from a temperature from 500° C. to 1600° C., producing an aerosol of nanostructures may be performed at a temperature selected from a temperature from 600° C. to 1600° C., producing an aerosol of nanostructures may be performed at a temperature selected from a temperature from 700° C. to 1600° C., producing an aerosol of nanostructures may be performed at a temperature selected from a temperature from 800° C. to 1600° C., producing an aerosol of nanostructures may be performed at a temperature selected from a temperature from 500° C. to 1400° C., producing an aerosol of nanostructures may be performed at a temperature selected from a temperature from 600° C. to 1400° C., producing an aerosol of nanostructures may be performed at a temperature selected from a temperature from 400° C. to 1000° C., or producing an aerosol of nanostructures may be performed at a temperature selected from a temperature from 950° C. to 1300° C. The reactor may be held at a temperature of 200° C. to 1600° C., the reactor may be held at a temperature of 400° C. to 1600° C., the reactor may be held at a temperature of 600° C. to 1600° C., the reactor may be held at a temperature of 800° C. to 1600° C., the reactor may be held at a temperature of 950° C. to 1600° C., the reactor may be held at a temperature of 300° C. to 1200° C., the reactor may be held at a temperature of 400° C. to 1000° C., the reactor may be held at a temperature of 450° C. to 1300° C., the reactor may be held at a temperature of 600° C. to 1300° C., the reactor may be held at a temperature of 800° C. to 1300° C., or the reactor may be held at a temperature of 950° C. to 1300° C.

The reactor may be configured to be held at two or more different temperatures, wherein different zones of the reactor may have different temperatures. For example, the catalyst particle growth zone of the reactor may be configured to be held at a temperature in the range from about 400° C. to about 1000° C., and the nanostructure growth zone may be configured to be held at a temperature in the range from about 800° C. to about 1300° C.

The concentration of the carbon precursor may also control the rates of nanostructure synthesis, wherein higher concentrations generally yielding faster rates of synthesis. The partial pressure of the carbon precursor in the reactor may be in the 0.001 to 10.0 Torr range. The total pressure in the reactor can range from about 1 mTorr to about 1 atm, where the total pressure is generally kept at no more than 2 times the partial pressure of the carbon precursor.

The reactor may be configured to produce or synthesize the nanostructures at a constant rate. For example, the nanostructures may be produced at a rate of 0.1 g/hr to 100 g/hr, the nanostructures may be produced at a rate of 0.1 g/hr to 90 g/hr, the nanostructures may be produced at a rate of 0.1 g/hr to 80 g/hr, the nanostructures may be produced at a rate of 0.1 g/hr to 70 g/hr, the nanostructures may be produced at a rate of 0.1 g/hr to 60 g/hr, the nanostructures may be produced at a rate of 0.1 g/hr to 50 g/hr, the nanostructures may be produced at a rate of 0.1 g/hr to 40 g/hr, the nanostructures may be produced at a rate of 0.1 g/hr to 30 g/hr, the nanostructures may be produced at a rate of 0.1 g/hr to 20 g/hr, the nanostructures may be produced at a rate of 0.1 g/hr to 10 g/hr, the nanostructures may be produced at a rate of 0.1 g/hr to 1 gram per hour, the nanostructures may be produced at a rate of 1 gram per hour to 100 g/hr, the nanostructures may be produced at a rate of 1 gram per hour to 90 g/hr, the nanostructures may be produced at a rate of 1 gram per hour to 80 g/hr, the nanostructures may be produced at a rate of 1 gram per hour to 70 g/hr, the nanostructures may be produced at a rate of 1 gram per hour to 60 g/hr, the nanostructures may be produced at a rate of 1 gram per hour to 50 g/hr, the nanostructures may be produced at a rate of 1 gram per hour to 40 g/hr, the nanostructures may be produced at a rate of 1 gram per hour to 30 g/hr, the nanostructures may be produced at a rate of 1 gram per hour to 20 g/hr, the nanostructures may be produced at a rate of 1 gram per hour to 10 g/hr, the nanostructures may be produced at a rate of 10 g/hr to 100 g/hr, the nanostructures may be produced at a rate of 10 g/hr to 90 g/hr, the nanostructures may be produced at a rate of 10 g/hr to 80 g/hr, the nanostructures may be produced at a rate of 10 g/hr to 70 g/hr, the nanostructures may be produced at a rate of 10 g/hr to 60 g/hr, the nanostructures may be produced at a rate of 10 g/hr to 50 g/hr, the nanostructures may be produced at a rate of 10 g/hr to 40 g/hr, the nanostructures may be produced at a rate of 10 g/hr to 30 g/hr, the nanostructures may be produced at a rate of 10 g/hr to 20 g/hr, or the nanostructures may be produced at a rate of 10 g/hr to 10 g/hr.

Matrix Materials

In various aspects of the present disclosure carbon nanostructures are dispersed into matrix materials to form a finely dispersed nanostructure material. Any suitable matrix material can be used according to the present disclosure, such as for example a powder or a liquid.

In certain aspects, the matrix material comprises a plurality of matrix particles selected from a carbon allotrope, a metal, an alloy, a metal oxide, a metal carbonate, silicon carbide, a ceramic, a polymer, a cement, or a combination thereof. The matrix material may comprise thermosetting and/or thermoplastic polymers. Thermosetting polymers used as matrix material may include phthalic/maelic type polyesters, vinyl esters, epoxies, phenolics, cyanates, bismaleimides, and nadic end-capped polyimides. Thermoplastic polymers may include polysulfones, polyamides, polycabonates, polyphenylene oxides, polysufides, polyether ether ketones, polyether sulfones, polyamide-imides, polyetherimides, polyimides, polyacrylates, and liquid crystalline polyester. Epoxies may also be used as a matrix material. Metals used as a matrix material may include alloys of aluminum. For example, metal alloys can comprise nickel cobalt aluminum (NCA), core shell gradient (CSG), spinel-based lithium-ion (LMO), lithium iron phosphate (LFP), cobalt-based lithium-ion (LCO), and nickel cobalt manganese (NCM). Ceramics used as a matrix material may include glass ceramics, oxides, nitrides, and carbides. For example, the metals may comprise lithium aluminosilicate, alumina, mullite, silicon nitride, and silicon carbide. Matrix materials may also comprise cermets, including carbide-based cermets, refractory cements, chromium-alumina, nickel-magnesia, and iron-zirconium carbide.

Alternatively, the matrix material may comprise a liquid matrix material, comprising a melted polymer selected from melted polyester, epoxy, polyimide, organosilicone, bismaleimide, phenol-formaldehyde, polysulfone (PSU), polyetheretherketone (PEEK), polyphenylene sulfide (PS), polyamide-imide (PAI), nylon, teflon, polystyrene, or polyetheylene, or a resin or a solution thereof. Alternatively or in combination, the liquid matrix material may comprise a molten metal selected from molten aluminum, magnesium, titanium, nickel, copper, niobium, cobalt, lead, steel, or beryllium. Alternatively or in combination, the liquid matrix material may comprise a metal alloy, a carbon pitch, a solution of dispersed graphene or graphene oxide sheets, a tar, a cement, an asphalt, an ionic liquid selected from a imidazolium-based liquid, an organic solvent selected from N,N-dimethylformamide or n-methylpyrrolidone, or a combination thereof.

For the methods described herein, metals may include but are not limited to, for example, magnesium, aluminum, titanium, manganese, iron, cobalt, nickel, copper, molybdenum, tungsten, palladium, chromium, ruthenium, gold, silver, zinc, zirconium, vanadium, silicon, or a combination thereof and including alloys thereof. In some aspects, the metal can be an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. In some aspects, metal alloys include MgZrZn, MgAlZn, AlCuZnMn, and AlMgZnSiMn. Metal oxides and metal carbides include the metals listed above. Exemplary metal oxides and metal carbides include aluminum oxide ($Al_2O_3$), magnesium oxide, and tungsten carbide.

The polymer used in the methods described herein may be a homopolymer or a copolymer. The polymer may be either linear or branched. For example, the copolymer may be a random copolymer, alternating copolymer, block copolymer, or graft copolymer. The polymer may be a polyphenylene, polyacetylene, polypyrrole, polythiophene, polyester, polyethylene, polyacrylate, polypropylene, polyamide, polyimide, polybenzoxazole, poly(amino acid), epoxy, polystyrene, polybutadiene, polycarbonate, substituted derivative thereof, or copolymer thereof. For example, polymers for use with the methods described herein may include polyacrylic acid, polyacrylonitrile, poly(methyl methacrylate), polyethylene propylene, polyisoprene, polyphenylene, polyphenylene sulfide, and/or polyetherketone.

The ceramic used with the methods described herein may be selected based on the particular application of the carbon nanostructure-reinforced composite material being developed from the nanostructure dispersion. Non-limiting examples of the ceramic include an oxide-based ceramic, nitride-based ceramic, carbide-based ceramic, boride-based ceramic, silicide-based ceramic, or a combination thereof. In some aspects, the oxide-based ceramic is silica ($SiO_2$) or titania ($TiO_2$). Often, the oxide-based ceramic, nitride-based ceramic, carbide-based ceramic, boride-based ceramic, or silicide-based ceramic contains a non-metal such as oxygen, nitrogen, boron, carbon, or silicon; a metal such as aluminum, lead, or bismuth; a transition metal such as niobium, tungsten, titanium, zirconium, hafnium, or yttrium; an alkali metal such as lithium or potassium; an alkaline earth metal such as calcium, magnesium, or strontium; a rare earth such as lanthanum or cerium; or a halogen such as fluorine or chlorine. In some aspects, the oxide-based ceramic, nitride-based ceramic, carbide-based ceramic, boride-based ceramic, or silicide-based ceramic contains more than one of the aforementioned non-metals.

A second carrier gas may help fluidize the matrix material, and carry the matrix particles from a matrix tank to the mixing chamber and/or from the mixing chamber to a collector. The second carrier gas can enter a matrix tank or a mixing chamber through a plurality of pores in a base of the tank or the chamber. The movement of the carrier gas caused by the action of a mixer of the matrix tank or mixing chamber can cause the matrix material to become finely dispersed in the gas, fluidizing the matrix material to form an aerosol of matrix particles. The second carrier gas may also be injected through a tangential injector of the matrix tank or of the mixing chamber, as described herein. The tangentially injected second carrier gas can form a vortex that can carry the fluidized matrix particles from the matrix tank to the mixing chamber, or the dispersion of nanostructures in the matrix particles from the mixing chamber to a collector.

Nanostructure Dispersions

The present disclosure provides methods and apparatuses for forming dispersions of carbon nanostructures. The carbon nanostructures dispersions can have a variety of forms, depending upon the compositions of the components and conditions under which the dispersions are formed. For example, the dispersion con comprise carbon nanostructures deposited onto the surface of the matrix particles or otherwise associated with the matrix particles.

In some aspects, the carbon nanostructures deposit on the surface of the matrix particles by adsorption, for example by physisorption or chemisorption. According to this aspect, each matrix particle can be coated with one or more layers of the carbon nanostructure material. Multiple layers of a coating of carbon nanostructure material may be layers of the same or of different compositions. The thickness of a single layer of a coating of carbon nanostructure material on the matrix particles may be in the range from about 1 nm to about 100 nm, about 50 nm to about 500 nm, about 100 nm to about 1000 nm, about 10 nm to about 1000 nm, about 50 nm to about 5000 nm, or about 100 nm to about 10000 nm.

In various aspects, the resultant nanostructure dispersion produced according to the present methods is a homogeneous mixture. In various aspects, the mixture comprises a plurality of individual nanostructures, wherein a nanostructure is an individual nanostructure if it is physically separated from other nanostructures. In the homogeneous mixture, greater than 70% of the nanostructures can be individual nanostructures, greater than 60% of the nanostructures can be individual nanostructures, greater than 50% of the nanostructures can be individual nanostructures, greater than 40% of the nanostructures can be individual nanostructures, greater than 30% of the nanostructures can be individual nanostructures, greater than 20% of the nanostructures can be individual nanostructures, greater than 10% of the nanostructures can be individual nanostructures, greater than 5% of the nanostructures can be individual nanostructures, from 5% to 70% of the nanostructures can be individual nanostructures, from 10% to 70% of the nanostructures can be individual nanostructures, from 15% to 70% of the nanostructures can be individual nanostructures, from 20% to 70% of the nanostructures can be individual nanostructures, from 25% to 70% of the nanostructures can be individual nanostructures, from 30% to 70% of the nanostructures can be individual nanostructures, from 35% to 70% of the nanostructures can be individual nanostructures, from 40% to 70% of the nanostructures can be individual nanostructures, from 45% to 70% of the nanostructures can be individual nanostructures, from 50% to 70% of the nanostructures can be individual nanostructures, from 5% to 50% of the nanostructures can be individual nanostructures, from 10% to 50% of the nanostructures can be individual nanostructures, from 15% to 50% of the nanostructures can be individual nanostructures, from 20% to 50% of the nanostructures can be individual nanostructures, from 25% to 50% of the nanostructures can be individual nanostructures, from 30% to 50% of the nanostructures can be individual nanostructures, from 35% to 50% of the nanostructures can be individual nanostructures, from 40% to 50% of the nanostructures can be individual nanostructures, from 45% to 50% of the nanostructures can be individual nanostructures, from 5% to 35% of the nanostructures can be individual nanostructures, from 10% to 35% of the nanostructures can be individual nanostructures, from 15% to 35% of the nanostructures can be individual nanostructures, from 20% to 35% of the nanostructures can be individual nanostructures, from 25% to 35% of the nanostructures can be individual nanostructures, from 5% to 30% of the nanostructures can be individual nanostructures, from 10% to 30% of the nanostructures can be individual nanostructures, from 15% to 30% of the nanostructures can be individual nanostructures, from 20% to 30% of the nanostructures can be individual nanostructures, from 25% to 30% of the nanostructures can be individual nanostructures, from 5% to 25% of the nanostructures can be individual nanostructures, from 10% to 25% of the nanostructures can be individual nanostructures, from 15% to 25% of the nanostructures can be individual nanostructures, from 20% to 25% of the nanostructures can be individual nanostructures, or essentially all of the nanostructures can be individual nanostructures.

Alternatively to or in combination with the individual nanostructures, the homogeneous mixture can also comprise non-individual nanostructures, wherein the non-individual nanostructures can be comprised in a plurality of nanostructure bundles. Essentially all of the non-individual nanostructures can be comprised in a plurality of nanostructure bundles, at least 99% of the non-individual nanostructures can be comprised in a plurality of nanostructure bundles, at least 95% of the non-individual nanostructures can be comprised in a plurality of nanostructure bundles, at least 90% of the non-individual nanostructures can be comprised in a plurality of nanostructure bundles, at least 85% of the non-individual nanostructures can be comprised in a plurality of nanostructure bundles, at least 80% of the non-individual nanostructures can be comprised in a plurality of nanostructure bundles, at least 75% of the non-individual nanostructures can be comprised in a plurality of nanostructure bundles, or at least 70% of the non-individual nanostructures can be comprised in a plurality of nanostructure bundles.

The homogeneous mixture can comprise a plurality of nanostructure bundles, wherein the plurality of nanostructure bundles can comprise a plurality of nanotube bundles. The homogeneous mixture can also comprise a mixture of individual nanostructures and a plurality of nanostructure bundles, wherein the nanostructure bundles can comprise nanotube bundles. Each of the bundles of nanostructures can comprise an average of 90 or fewer nanostructures, each of the bundles of nanostructures can comprise an average of 80 or fewer nanostructures, each of the bundles of nanostructures can comprise an average of 70 or fewer nanostructures, each of the bundles of nanostructures can comprise an average of 60 or fewer nanostructures, each of the bundles of nanostructures can comprise an average of 50 or fewer nanostructures, each of the bundles of nanostructures can comprise an average of 40 or fewer nanostructures, each of the bundles of nanostructures can comprise an average of 35 or fewer nanostructures, each of the bundles of nanostructures can comprise an average of 30 or fewer nanostructures, each of the bundles of nanostructures can comprise an average of 25 or fewer nanostructures, each of the bundles of nanostructures can comprise an average of 20 or fewer nanostructures, each of the bundles of nanostructures can comprise an average of 15 or fewer nanostructures, each of the bundles of nanostructures can comprise an average of 14 or fewer nanostructures, each of the bundles of nanostructures can comprise an average of 13 or fewer nanostructures, each of the bundles of nanostructures can comprise an average of 12 or fewer nanostructures, each of the bundles of nanostructures can comprise an average of 11 or fewer nanostructures, each of the bundles of nanostructures can comprise an average of 10 or fewer nanostructures, each of the bundles of nanostructures can comprise an average of 9 or fewer nanostructures, each of the bundles of nanostructures can comprise an average of 8 or fewer nanostructures, each of the bundles of nanostructures can comprise an average of 7 or fewer nanostructures, each of the bundles of nanostructures can comprise an average of 6 or fewer nanostructures, each of the bundles of nanostructures can comprise an average of 5 or fewer nanostructures, each of the bundles of nanostructures can comprise an average of 4 or fewer nanostructures, each of the bundles of nanostructures can comprise an average of 3 or fewer nanostructures, or each of the bundles of nanostructures can comprise an average of 2 or fewer nanostructures.

Further, each of the bundles of nanostructures can comprise an average of from 3 to 15 nanostructures, each of the bundles of nanostructures can comprise an average of from 4 to 15 nanostructures, each of the bundles of nanostructures can comprise an average of from 5 to 15 nanostructures, each of the bundles of nanostructures can comprise an average of from 5 to 14 nanostructures, each of the bundles of nanostructures can comprise an average of from 5 to 13 nanostructures, each of the bundles of nanostructures can comprise an average of from 5 to 12 nanostructures, each of the bundles of nanostructures can comprise an average of from 5 to 11 nanostructures, each of the bundles of nanostructures can comprise an average of from 5 to 10 nanostructures, each of the bundles of nanostructures can comprise an average of 15 or fewer nanostructures, each of the bundles of nanostructures can comprise an average of 14 or fewer nanostructures, each of the bundles of nanostructures can comprise an average of 13 or fewer nanostructures, each of the bundles of nanostructures can comprise an average of 12 or fewer nanostructures, each of the bundles of nanostructures can comprise an average of 11 or fewer nanostructures, each of the bundles of nanostructures can comprise an average of 10 or fewer nanostructures, each of the bundles of nanostructures can comprise an average of 9 or fewer nanostructures, each of the bundles of nanostructures can comprise an average of 8 or fewer nanostructures, each of the bundles of nanostructures can comprise an average of 7 or fewer nanostructures, each of the bundles of nanostructures can comprise an average of 6 or fewer nanostructures, each of the bundles of nanostructures can comprise an average of 5 or fewer nanostructures, each of the bundles of nanostructures can comprise an average of 4 or fewer nanostructures, each of the bundles of nanostructures can comprise an average of 3 or fewer nanostructures, or each of the bundles of nanostructures can comprise an average of 2 or fewer nanostructures.

The nanostructure bundles can have an average diameter of 2 nm to 100 nm. In some, the nanostructure bundles can have an average diameter of 10 nm to 90 nm. In some, the nanostructure bundles can have an average diameter of 20 nm to 80 nm. In some, the nanostructure bundles can have an average diameter of 30 nm to 70 nm. In some, the nanostructure bundles can have an average diameter of 40 nm to 60 nm. In some, the nanostructure bundles can have an average diameter of less than 100 nm. In some, the nanostructure bundles can have an average diameter of less than 80 nm. In some, the nanostructure bundles can have an average diameter of 50 nm to 10 nm. In some, the nanostructure bundles can have an average diameter of less than 60 nm.

Properties of the resultant nanostructure dispersion can be controlled in a variety of ways. The loading amount (mass fraction or weight percentage) of the nanostructures in the matrix can be modulated to tune the resultant nanostructure dispersion, and can be determined based at least one desired property of the carbon-reinforced composite material to be formed using the nanostructure dispersion. For example, the percent weight of the nanostructures in the matrix can be controlled to be in the range from about 0.001 wt. % to about 50 wt. %, particularly about 0.01 wt. % to about 10 wt. %, and more particularly about 0.01 wt % to about 1 wt. %. The loading amount of the nanostructure in the matrix can be controlled in various ways. For example, the amount of time for which the aerosol of nanostructures is mixed with the matrix material or particles can be varied. Alternatively, or in combination, the duration of nanostructure synthesis can be modulated while the rate of nanostructure synthesis is held constant, or the quantity of the matrix material provided in the mixing chamber can be modulated.

The types of nanostructures formed (e.g., single-walled carbon nanotubes, multi-walled carbon nanotubes, etc.) and their physical properties (e.g., length of nanotubes) can also impact the properties of the resultant nanostructure dispersions. These parameters can be controlled by varying one or more synthesis conditions of the nanostructures, including reaction temperature, carrier gas flow rate, carbon precursor composition, catalyst composition, and promoter composition. For example, the rate of flow of the second carrier gas into the mixing chamber can have a rate selected from 100 sccm to 5000 sccm, the rate of flow of the second carrier gas into the mixing chamber can have a rate selected from 500 sccm to 5000 sccm, the rate of flow of the second carrier gas into the mixing chamber can have a rate selected from 1000 sccm to 5000 sccm, the rate of flow of the second carrier gas into the mixing chamber can have a rate selected from 1500 sccm to 5000 sccm, the rate of flow of the second carrier gas into the mixing chamber can have a rate selected from 100 sccm to 2500 sccm, the rate of flow of the second carrier gas into the mixing chamber can have a rate selected from 500 sccm to 2500 sccm, the rate of flow of the second carrier gas into the mixing chamber can have a rate selected from 1000 sccm to 2500 sccm, or the rate of flow of the second carrier gas into the mixing chamber can have a rate selected from 1500 sccm to 2500 sccm.

The nanostructure dispersion particles can be mechanically deformable and/or pulverizable. The particles can have an initial average particle size of about 0.1 μm to about 500 μm or to about 0.5 μm to about 250 μm. The shape of the particles can be regular or irregular, and can, for example, be spherical or oblong.

Carbon-Reinforced Composite Materials

In various embodiments, the present disclosure provides for composite materials formed from the nanostructure dispersions described herein. In some aspects, the carbon nanostructure dispersions serve as a precursor for carbon-reinforced composite materials. In certain aspects, the carbon nanostructure dispersion is removed from the collector and further processed to form a carbon-reinforced composite material having a matrix formed from the precursor.

In certain aspects, a powder of the nanostructure dispersion is placed into a mold and sintered to form a carbon-reinforced composite material. The term "sintering" as used herein refers to the densification of a particulate component, for example the powder of the nanostructure dispersion, involving the removal of at least a portion of the pores between the nanostructure dispersion powder particles combined with coalescence and bonding between adjacent nanostructure dispersion powder particles. Alternately, spark plasma sintering can be performed by placing the nanostructure dispersion powder in a mold, establishing a vacuum in a chamber containing the mold using a vacuum pump, introducing gas, for example, argon, hydrogen, or oxygen, and the like, into the chamber to apply pressure to the mold, and treating the nanostructure dispersion powder with plasma in a plasma zone formed in the central portion of the mold. The pressure in the chamber can, for example, be from about 50 megapascals (MPa) to about 100 MPa or about 60 MPa to about 90 MPa. The plasma treatment can be performed at a temperature of about 150° C. to about 700° C. and at a heating rate of about 25° C./min to about 75° C./min for about 1 minute to about 30 minutes. In yet another example, the nanostructure dispersion can be subjected to hot or cold isostatic pressing. In another aspect, the nanostructure dispersion can comprise a polymer, and can be molded and cured. In yet another aspect, the nanostructure dispersion can be extruded.

Further processing of the nanostructure dispersion can result in the formation of a carbon nanostructure-reinforced composite material whereby the nanostructure dispersion particles form the matrix, and the nanostructures are homogeneously dispersed throughout the matrix. Often, the matrix and carbon nanostructures form a monolith with substantially all of the matrix particles being integrated into the matrix.

The carbon-reinforced composite materials comprising the nanostructure dispersions produced using the methods described herein are useful for preparing aspects of, elements of, parts of, portions of, or the like, for applications in, but not limited to, automotive, aerospace, oil and natural gas industries. Exemplary aspects, elements, parts, portions or the like include a packer element, a blow out preventer element, a submersible pump motor protector bag, a sensor protector, a sucker rod, a production tubing, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, a plug, a valve, a connector, a filter, a latch, or other downhole elements. Carbon-reinforced composite materials may also be useful in applications currently available for graphite fibers and other high-strength fibers, such as structural support and body panels or brakes for vehicles, aircraft components, spacecraft, marine applications such as boat hull structures, sporting goods such as sailboards and skis, structural components for homes, furniture, tools, and implants and prostheses. They may also be useful in battery applications such as supercapacitor and fuel cells, in energy storage devices such as anodes, cathodes or hydrogen storage materials, and in electronics applications such as heat sinks for thermal management.

While preferred aspects of the present disclosure have been shown and described herein, it will be obvious to those skilled in the art that such aspects are provided by way of example only. Numerous variations, changes, and substitutions will now occur to those skilled in the art without departing from the disclosure. It should be understood that various alternatives to the aspects of the disclosure described herein may be employed in practicing the disclosure. It is intended that the following claims define the scope of the disclosure and that methods and structures within the scope of these claims and their equivalents be covered thereby.

What is claimed is:

1. A method for producing a nanostructure dispersion, the method comprising:
   providing a reactor and a mixing chamber, wherein:
      the reactor is in fluidic communication with the mixing chamber;
      the reactor comprises:
         a nanostructure growth zone; and
         a catalyst particle growth zone, and
      the mixing chamber comprises:
         a base of the mixing chamber, comprising a plurality of pores; and
         a mixer;
   producing an aerosol of nanostructures in the reactor;
   providing a matrix material in the mixing chamber;
   transferring the aerosol of nanostructures from the reactor to the mixing chamber;
   introducing a first carrier gas into the mixing chamber through the plurality of pores of the base of the mixing chamber; and
   using the mixer to disperse the aerosol of nanostructures into the matrix material, thereby producing the nanostructure dispersion.

2. The method of claim 1, further comprising:
   producing an aerosol of matrix particles from the matrix material;
   providing the aerosol of matrix particles in the mixing chamber; and
   dispersing the aerosol of nanostructures into the matrix material comprising the aerosol of matrix particles, thereby producing the nanostructure dispersion.

3. The method of claim 1, wherein the mixer comprises a mechanical stirrer, a magnetic stirrer, a ball miller, a sonicator, or a combination thereof.

4. The method of claim 1, further comprising transferring the nanostructure dispersion to a collector as an aerosol.

5. The method of claim 1, further comprising:
   providing a matrix tank in fluidic communication with the mixing chamber, wherein the matrix tank comprises the matrix material; and
   transferring the matrix material from the matrix tank to the mixing chamber.

6. The method of claim 5, further comprising:
   producing an aerosol of matrix particles from the matrix material in the matrix tank;
   providing a tangential injection of a carrier gas to the matrix tank, thereby creating a vortex of the aerosol of matrix particles; and
   transferring the matrix material comprising the vortex of the aerosol of matrix particles from the matrix tank to the mixing chamber.

7. The method of claim 1, further comprising producing a plurality of catalyst particles in the catalyst particle growth zone of the reactor.

8. The method of claim 7, comprising producing the aerosol of nano structures by decomposing a carbon precursor at the plurality of catalyst particles.

9. The method of claim 1, further comprising producing an aerosol of matrix particles in the mixing chamber by applying a tangential vortex to the mixing chamber, vertically shaking the mixing chamber, introducing the carrier gas into the mixing chamber, or a combination thereof.

10. The method of claim 5, further comprising:
    providing a plurality of pores through a base of the matrix tank;
    introducing a second carrier gas into the matrix tank through the plurality of pores; and producing an aerosol of matrix particles in the second carrier gas in the mixing chamber.

11. The method of claim 1, wherein:
the aerosol of nano structures in the reactor is produced continuously;
the matrix material in the mixing chamber is provided continuously; and the aerosol of nano structures is continuously transferred from the reactor to the mixing chamber, thereby continuously producing the nanostructure dispersion.

12. The method of claim 1, wherein the reactor comprises a plurality of zones having different temperatures.

13. The method of claim 12, wherein the catalyst particle growth zone is held at a temperature of 400° C. to 1000° C., and the nanostructure growth zone is held at a temperature of 800° C. to 1300° C.

14. The method of claim 1, wherein the matrix material is a solid powder or liquid.

15. The method of claim 1, wherein the aerosol of nanostructures is transferred directly from the reactor to the mixing chamber.

16. The method of claim 1, further comprising transferring the nanostructure dispersion to a collector.

17. The method of claim 1, further comprising:

providing an injector in fluidic communication with the reactor; and introducing a catalyst from the injector into the reactor.

18. The method of claim 17, wherein the catalyst is introduced from the injector into the reactor as a liquid, spray, or aerosol.

19. The method of claim 17, wherein the catalyst comprises a plurality of colloidal particles.

20. The method of claim 1, further comprising:

providing an injector in fluidic communication with the reactor; and introducing a catalyst precursor, a promoter, or a combination thereof from the injector into the reactor.

21. The method of claim 5, wherein the matrix tank is positioned below the mixing chamber.

22. The method of claim 5, wherein the matrix tank is positioned above the reactor.

23. The method of claim 5, wherein the matrix tank is positioned below the reactor.

24. The method of claim 17, wherein the injector is positioned above the reactor.

25. The method of claim 17, wherein the injector is positioned below the reactor.

26. The method of claim 1, wherein the mixing chamber is positioned above the reactor.

27. The method of claim 5, wherein the mixing chamber is positioned above the reactor.

28. The method of claim 17, wherein the mixing chamber is positioned above the reactor.

29. The method of claim 1, wherein the mixing chamber is positioned below the reactor.

30. The method of claim 5, wherein the mixing chamber is positioned below the reactor.

31. The method of claim 17, wherein the mixing chamber is positioned below the reactor.

32. The method of claim 20, wherein the catalyst precursor is selected from a metallocene, a metal acetylacetonate, a metal phthalocyanine, a metal porphyrin, a metal salt, a metalorganic compound, or a combination thereof.

33. The method of claim 20, wherein the catalyst precursor is selected from ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, a cobalt salt, a molybdenum salt, a ruthenium salt, or a combination thereof.

34. The method of claim 20, wherein the promoter is selected from thiophene, carbon disulfide or any other sulfur containing compound, tetrahydrofuran, dimethylformamide, dimethyl sulfoxide, or a combination thereof.

35. The method claim 1, wherein the reactor is positioned at an angle of from 60 to 180° relative to the mixing chamber.

36. The method of claim 1, further comprising introducing a carbon precursor into the reactor.

37. The method of claim 36, wherein the producing of the aerosol of nano structures comprises decomposing the carbon precursor.

38. The method of claim 36, wherein the carbon precursor is a hydrocarbon, an alcohol, an ester, a ketone, an aromatic, an aldehyde, or a combination thereof.

39. The method claim 36, wherein the carbon precursor is selected from methane, ethane, acetylene, ethylene, ethanol, carbon monoxide, carbon dioxide, naphthalene, xylene, or a combination thereof.

40. The method of claim 36, further comprising mixing the carbon precursor with a second carrier gas prior to introducing the carbon precursor into the reactor.

41. The method of claim 40, wherein the second carrier gas is an inert gas.

42. The method claim 40, wherein the second carrier gas comprises a gas selected from argon, hydrogen, helium, nitrogen, or a combination thereof.

43. The method of claim 7, wherein the mean diameter of the plurality of catalyst particles is from 0.5 nm to 5 nm.

44. The method of claim 7, wherein the mean diameter of the plurality of catalyst particles is from 5 nm to 20 nm.

45. The method of claim 7, wherein the plurality of catalyst particles comprise a transition metal.

46. The method of claim 7, wherein the plurality of catalyst particles comprise a material selected from a d-block transition metal, an f-block transition metal, or a combination thereof.

47. The method of claim 46, wherein the d-block transition metal is selected from iron, nickel, cobalt, gold, silver, or a combination thereof.

48. The method of claim 7, wherein the catalyst particles are supported on a catalyst support, and wherein the catalyst support is selected from alumina, silica, zirconia, magnesia, or zeolites.

49. The method of claim 48, wherein the catalyst support is the same as or different from the matrix material.

50. The method of claim 8, wherein the decomposing is selected from thermal decomposing or catalytic decomposing.

51. The method of claim 10, wherein the second carrier gas is an inert gas.

52. The method of claim 10, wherein the second carrier gas comprises a gas selected from argon, hydrogen, helium, nitrogen, or a combination thereof.

53. The method of claim 1, wherein the nanostructure dispersion is a homogeneous mixture.

54. The method claim 53, wherein the homogeneous mixture comprises a mixture of individual nanostructures and a plurality of nanostructure bundles, wherein the plurality of nanostructure bundles comprises a plurality of nanotube bundles.

55. The method of claim 53, wherein the homogeneous mixture comprises a plurality of individual nanostructures, wherein a nanostructure is an individual nanostructure if the nanostructure is physically separated from other nanostructures.

56. The method of claim 55, wherein from 20% to 50% of the nanostructures are individual nano structures.

57. The method of claim 56, further comprising non-individual nano structures, wherein at least 80% of the non-individual nanostructures are comprised in a plurality of nanostructure bundles.

58. The method of claim 57, wherein the plurality of nanostructure bundles comprises a plurality of nanotube bundles.

59. The method of claim 57, wherein each of the nanostructure bundles comprises an average of 30 or fewer nano structures.

60. The method of claim 57, wherein each of the nanostructure bundles comprises an average of 15 or fewer nanostructures.

61. The method of claim 57, wherein the nanostructure bundles have an average diameter of 1-50 nm.

62. The method of claim 1, wherein the aerosol of nanostructures comprises carbon nanotubes or carbon fibers.

63. The method of claim 62, wherein the carbon nanotubes are single walled carbon nanotubes or multi walled carbon nanotubes.

64. The method of claim 1, wherein the nano structure dispersion is continuously produced.

65. The method of claim 5, further comprising:
continuously transferring the aerosol of nano structures from the reactor to the mixing chamber; and
continuously transferring the matrix material into the mixing chamber from the matrix tank.

66. The method of claim 5, further comprising:
continuously producing an aerosol of matrix particles from the matrix material; and
continuously transferring the matrix material comprising the aerosol of matrix particles into the mixing chamber from the matrix tank.

67. The method of claim 65, further comprising:
continuously producing an aerosol of matrix particles from the matrix material; and
continuously transferring the matrix material comprising the aerosol of matrix particles into the mixing chamber from the matrix tank.

68. The method of claim 1, further comprising:
continuously producing an aerosol of matrix particles from the matrix material;
continuously providing the aerosol of matrix particles in the mixing chamber; and
dispersing the aerosol of nano structures into the matrix material comprising the aerosol of matrix particles.

69. The method of claim 1, wherein the matrix material comprises a material selected from a carbon allotrope, a metal, an alloy, a metal oxide, a metal carbonate, silicon carbide, a ceramic, a polymer, a cement, or a combination thereof.

70. The method of claim 1, wherein the matrix material comprises a liquid matrix material selected from:
a melted polymer selected from melted polyester, epoxy, polyimide, organosilicone, bismaleimide, phenol-formaldehyde, polysulfone (PSU), polyetheretherketone (PEEK), polyphenylene sulfide (PPS), polyamide-imide (PAI), nylon, teflon, polystyrene, or polyethylene;
a resin or a solution thereof;
a molten metal selected from molten aluminum, magnesium, titanium, nickel, copper, niobium, cobalt, lead, steel, or beryllium;
a metal alloy;
a carbon pitch;
a solution of dispersed graphene or graphene oxide sheets;
a tar;
a cement;
an asphalt;
an ionic liquid selected from an imidazolium-based liquid;
an organic solvent selected from N,N-dimethylformamide or n-methylpyrrolidone; or
a combination thereof.

71. The method of claim 1, wherein producing the aerosol of nanostructures is performed at a temperature selected from 950° C. to 1300° C.

72. The method of claim 1, wherein the reactor is held at a temperature of 950° C. to 1300° C.

73. The method of claim 10, wherein the rate of flow of the second carrier gas into the mixing chamber has a rate selected from 1000 sccm to 2500 sccm.

74. The method of claim 10, wherein the rate of flow of the second carrier gas into the mixing chamber has a rate selected from 1500 sccm to 2500 sccm.

75. The method of claim 1, wherein the rate of production of the aerosol of nanostructures is constant and wherein the mass percent of the nanostructures in the nanostructure dispersion is controlled by modulating the quantity of matrix material in the mixing chamber.

76. The method of claim 75, wherein the nanostructures in the nanostructure dispersion are produced at a rate of 0.1 g/hr to 10 g/hr.

77. The method of claim 1, wherein the rate of production of the aerosol of nanostructures is constant and wherein the mass percent of the nanostructures in the nanostructure dispersion is controlled by modulating the duration of the production of the aerosol of nano structures.

78. The method of claim 77, wherein the nanostructures in the nanostructure dispersion are produced at a rate of 0.1 g/hr to 10 g/hr.

79. The method of claim 1, wherein the aerosol of nanostructures comprises boron nitride nanotubes (BNNTs).

* * * * *

UNITED STATES PATENT AND TRADEMARK OFFICE
CERTIFICATE OF CORRECTION

PATENT NO. : 9,987,608 B2
APPLICATION NO. : 14/858786
DATED : June 5, 2018
INVENTOR(S) : Elena Pigos It is certified that error appears in the above-identified patent and that said Letters Patent is hereby corrected as shown below:

In the Claims

Column 25, Line 4, Claim 11:
Please replace "nano structures" with --nanostructures--

Column 25, Line 8, Claim 11:
Please replace "nano structures" with --nanostructures--

Column 26, Line 17, Claim 37:
Please replace "nano structures" with --nanostructures--

Column 27, Line 7, Claim 56:
Please replace "nano structures" with --nanostructures--

Column 27, Line 9, Claim 57:
Please replace "nano structures" with --nanostructures--

Column 27, Lines 16-17, Claim 59:
Please replace "nano structures" with --nanostructures--

Column 27, Line 28, Claim 64:
Please replace "nano structure" with --nanostructure--

Column 27, Line 31, Claim 65:
Please replace "nano structures" with --nanostructures--

Column 27, Line 52, Claim 68:
Please replace "nano structures" with --nanostructures--

Signed and Sealed this
Twenty-eighth Day of August, 2018

Andrei Iancu
*Director of the United States Patent and Trademark Office*

Column 28, Line 50, Claim 77:
Please replace "nano structures" with --nanostructures--